United States Patent [19]

Müller

[11] Patent Number: 4,513,216
[45] Date of Patent: Apr. 23, 1985

[54] MULTI-POLE ROTOR PARTICULARLY FOR SMALL AND MINIATURE ELECTRIC GENERATORS AND MOTORS

[75] Inventor: Werner Müller, Godesburg, Fed. Rep. of Germany

[73] Assignee: Magnetfabrik Bonn GmbH, vorm. Gewerkschaft Windhorst, Bonn am Rhein, Fed. Rep. of Germany

[21] Appl. No.: 850,049

[22] Filed: Nov. 9, 1977

[30] Foreign Application Priority Data

Jun. 15, 1977 [DE] Fed. Rep. of Germany ....... 2727003

[51] Int. Cl.³ ............................................ H02K 21/12
[52] U.S. Cl. .................................... 310/156; 310/42; 310/43; 310/263; 335/303
[58] Field of Search .................... 310/42, 43, 44, 156, 310/263, 261, 152, 154; 335/303

[56] References Cited

U.S. PATENT DOCUMENTS

| | | |
|---|---|---|
| 3,728,786 | 4/1973 | Lucas et al. .................... 310/156 X |
| 3,796,899 | 3/1974 | Giachello ............................ 310/156 |
| 3,872,334 | 3/1975 | Loubier ................................ 310/43 |
| 3,973,153 | 8/1976 | Berney ............................ 310/263 X |
| 4,002,937 | 1/1977 | Anson ............................. 335/303 X |
| 4,004,167 | 1/1977 | Meckling ....................... 335/303 X |
| 4,028,573 | 6/1977 | Terrone ........................... 310/42 X |

Primary Examiner—Donovan F. Duggan
Attorney, Agent, or Firm—George H. Mitchell, Jr.

[57] ABSTRACT

A rotor for small motors, or generators, having circumferentially arranged segmental poles which extend over the entire axial length of the rotor can be fabricated by molding a pair of elements from particulate magnetic material of high coercivity with a binder in the shape of identical crown gears; the rotor being completed by arranging the elements on a shaft with the toothed portions facing each other in interfitting engagement. Other modifications are disclosed in which the pole pieces may be formed separately from, or integrally with, a radial pole carrier, and the pole carrier may be in the shape of a spool with the segmental pole pieces assembled thereon.

2 Claims, 15 Drawing Figures

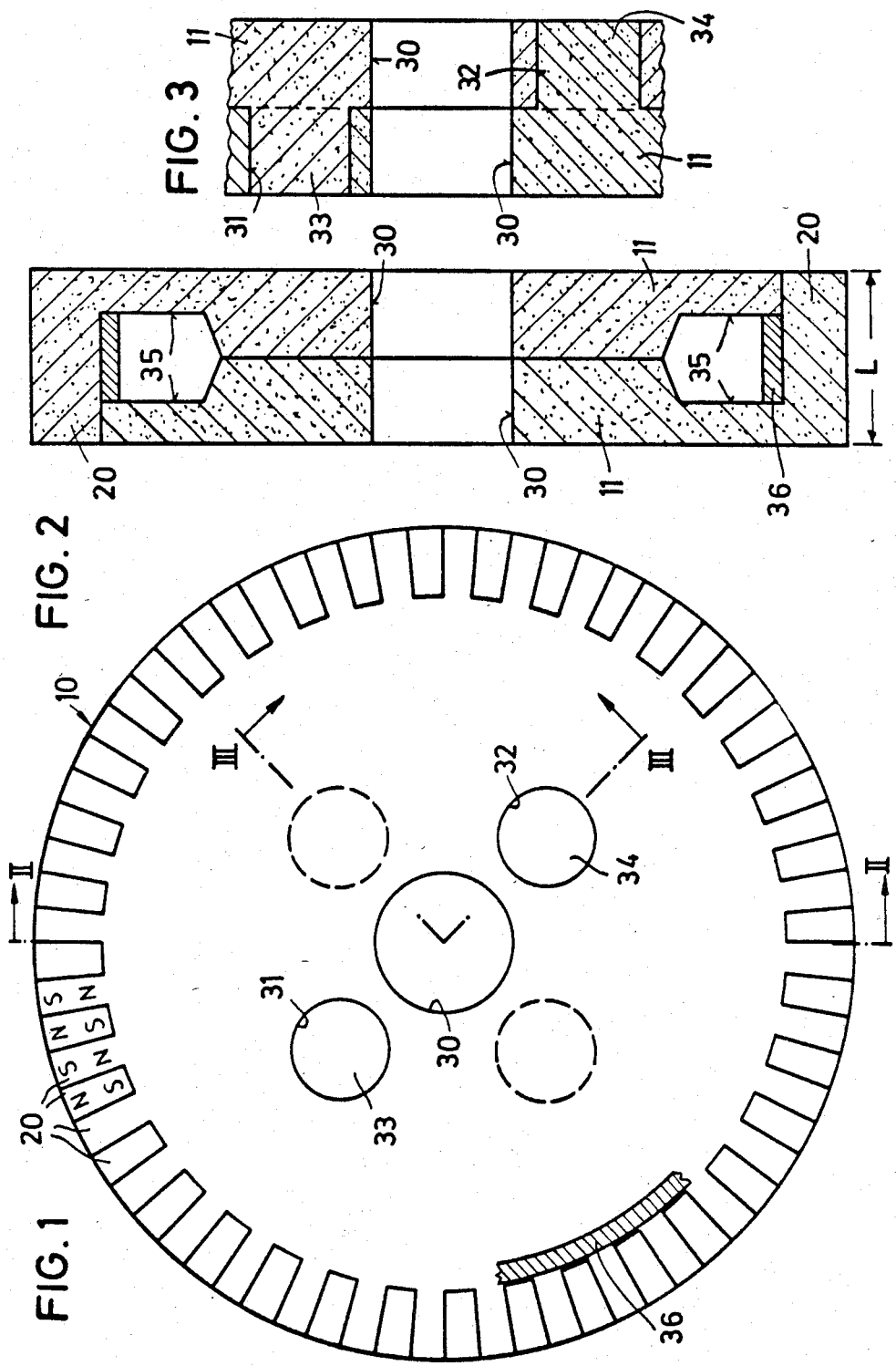

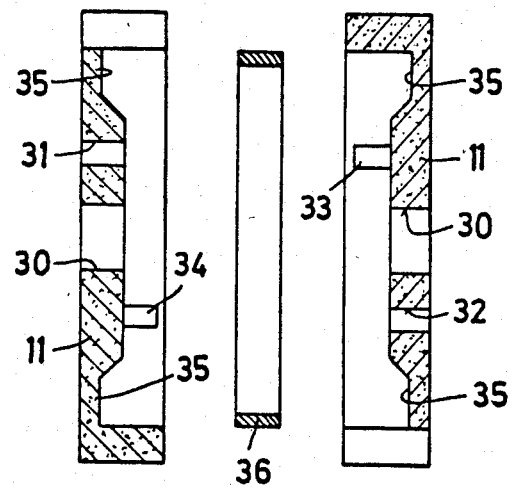
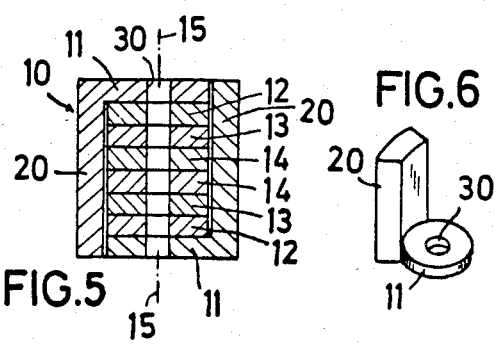
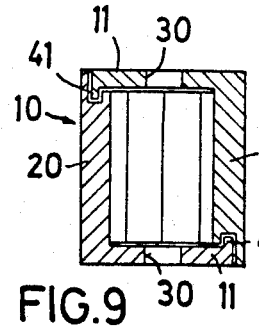
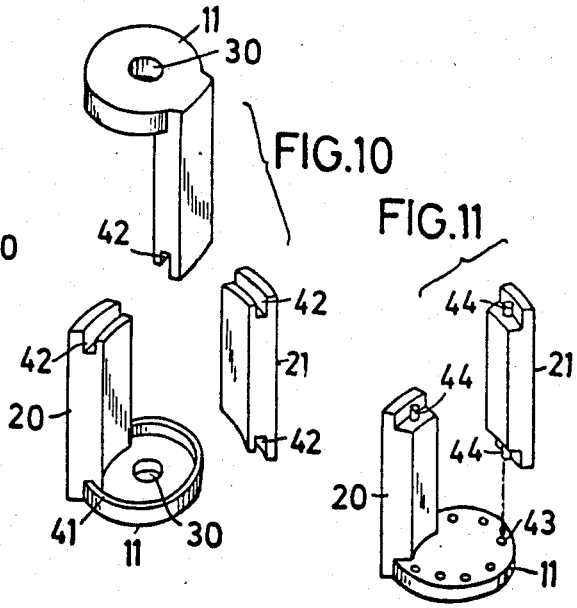

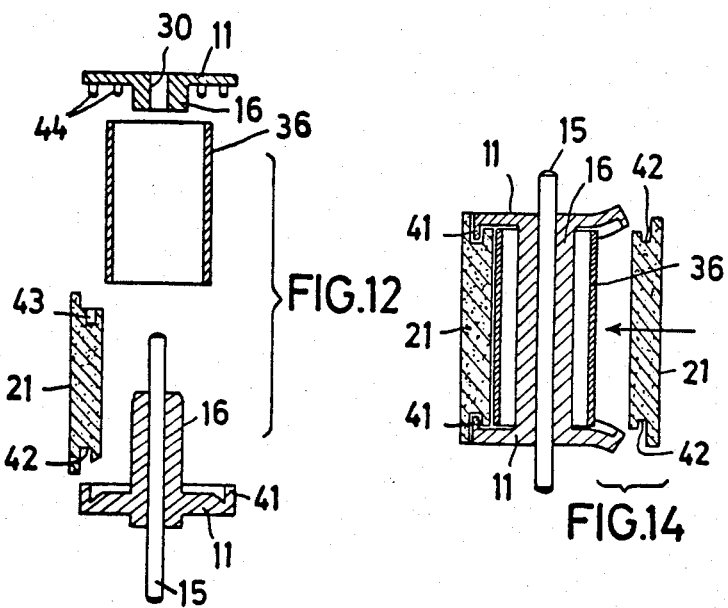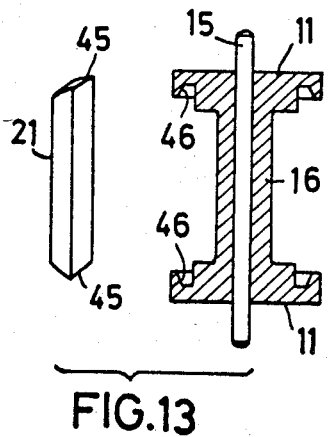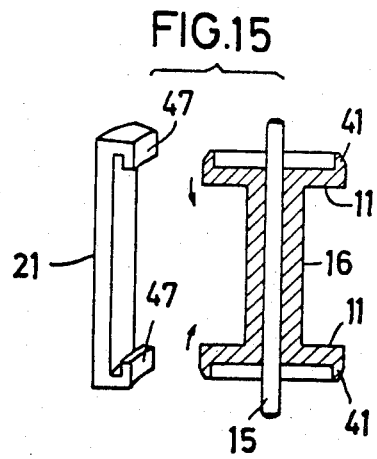

MULTI-POLE ROTOR PARTICULARLY FOR SMALL AND MINIATURE ELECTRIC GENERATORS AND MOTORS

The invention is relative to a multi-pole rotor particularly for small and miniature electric generators and motors, such as tachometers, stepping motors, synchronized clockworks and the like, with disk-shaped pole carriers mounted on the rotor axis parallel to each other, and poles magnetized oppositely to each other arranged on the rotor circumference parallel to or at an angle to the rotor axis.

In one known multi-pole rotor for electric small and miniature motors, a cylindrical permanent magnet body is suspended on the rotor axis, at the ends of which are attached two disk-shaped sheet metal elements with pole lobes arranged alternately and oppositely in the direction of the rotor axis. This rotor however is very bulky in relation to its performance and is expensive to produce.

An object of this invention is to provide a multi-pole rotor for generators and motors which is so configured that it has a large number of poles in a space-saving structure, and can be constructed in a simple manner from a number of prefabricated individual structural parts.

This is achieved according to the invention essentially in that the poles are configured as circumferential segments and consist of a highly coercive, plastic bound permanent magnet material, and extend essentially over the entire length of the rotor and are magnetized oppositely to each other, such that both on the entire outer periphery and also on the entire inner periphery of the series or arrangement of poles there is present a close series or arrangement of N-S-N-S . . . or S-N-S-N . . . poles.

It is possible to produce such rotors or armatures of a plastic bound highly coercive permanent magnet material in the size needed for small and miniature motors in any desired embodiment, with either a less than square or with a more than square relationship of rotor length to rotor diameter, wherein the rotor may consist of either two or more individual structural elements with their axially transverse pole teeth interfitting with each other.

In the preferred embodiment of the invention, it is provided that the pole carrier as well as the poles themselves consist of a preferably integrally formed plastic bound, highly coercive particulate permanent magnet material.

It is also provided that the pole carriers may be configured as circular disks, with the poles attached to their periphery by a tongue and groove connection, by a nose or pin insert connection, or the like. The pole carriers can also be tightly connected with each other at both rotor ends by a shaft member along the rotor axis or can be embodied as a type of spool comprising a flexible plastic material, so that the poles can be tightly clamped between the pole carriers. In an embodiment of this type, the pole carriers can partially overlap at the ends. In another embodiment it is provided that the poles overlap the pole carriers with radially inwardly directed hooked projections at their ends.

If in the aforementioned embodiments the prefabricated segmented poles are not attached to the prefabricated disk or spool shaped carriers until the assembly of the rotor, then in another embodiment it is also possible to construct the poles in one integral piece with the pole carriers. In this embodiment of the invention, the poles may be directed oppositely to each other on the periphery of two disk-like pole carriers in an arrangement resembling a pair of crown gears which are so arranged as to their clearances, that they form a close circular series arrangement of poles which are magnetized oppositely to each other, when the pole carriers are connected together. A rotor of this type will have a generally less than square relationship of rotor length to rotor diameter.

However, it is to be realized that a rotor of the type having an axial lengths greater than the rotor diameter can be constructed, and this too may fall within the limitations of the invention, wherein the rotor is constructed not of two disk-like pole carriers with pole teeth arranged in a cog arrangement on their outside periphery, but rather may be constructed of a number of structural elements each of which includes a pole joined integrally to a single pole carrier.

In this embodiment, each of the axially extending pole pieces is integrally formed with a radially extending carrier which is provided with a central bore to receive a shaft. However, the carrier for each pole piece is axially offset with respect to the carrier for another pole and is of sufficient thickness so that when the rotor is assembled from identical pairs of these integrally formed elements the carriers are arranged along the length of the shaft in axially abutting engagement, while the pole pieces will lie uniformly in circumferentially abutting engagement with each other in axial alignment.

Embodiments of the invention are shown diagrammatically in the attached drawing, in which;

FIG. 1 shows a frontal view of a rotor in the direction of the rotor axis;

FIG. 2 shows a cross section through the rotor along line II—II of FIG. 1;

FIG. 3 shows a partial cross section through the rotor along line III—III of FIG. 1;

FIG. 4 shows the individual parts of the rotor of FIGS. 1-3 separated from each other; and;

FIGS. 5-15 show different embodiments of a rotor constructed with more or fewer poles and pole carriers.

FIGS. 1 to 4 show an embodiment of a multi-pole rotor 10 for electric small and miniature motors such as tachometers, stepping motors, synchronized clockworks and the like, which is constructed of two identical, circular disk, pole carriers 11 with segmental poles 20 arranged at their periphery, formed integrally in one piece.

Poles 20 have a rectangular annular cross section and are arranged on the periphery of each pole carrier 11 in a manner to resemble oppositely alternating teeth of a crown gear, and mounted with clearances such that they form a tight circular annular series of oppositely magnetized poles, connected with each other by pole carriers 11. Pole carriers 11 may be produced with their toothed poles engaging together with their teeth from a highly coercive, plastic bound permanent magnet material, such as molded ALNiCo powder, mixed with a binder agent.

For their opposite connection, the disk-like pole carriers are provided with central axial openings 30 on rotor shaft (not shown) running axially parallel to openings 31 and 32 which engage with pins 33 and 34 of the other pole carrier. On the inside of the series of poles is also provided an annular groove 35 to receive a ring 36 of ferromagnetic material.

FIG. 2 shows the segmental poles 20 projecting parallel to each other or in oblique arrangement extending over the entire rotor length L, which are oppositely magnetized so that both over the entire outer periphery and also over the entire inner periphery of the series of poles there is present a close series arrangement of N-S-N-S or S-N-S-N poles. Of course it is also possible to distribute the series of poles in groups over a rather large rotor periphery, and/or coordinate them in a spiral on the rotor periphery.

While the poles 20 of rotor 10 shown in FIGS. 1 to 4 are constructed on the periphery of two identical rotor parts, the rotors 10 shown in FIGS. 5 to 15 are composed of a number of individual structural parts fitted together to provide the rotor foundation.

In the embodiment of FIGS. 5 to 8, a segmentally-shaped, preferably annularly cross section poles 20 are combined respectively with pole carriers 11, 12, 13, 14 each having a central opening 30, either joined together, or formed as one integral piece.

In order to configure a rotor 10 out of several of this type of individual structural elements, with for example eight or more poles 20, pole carriers 11, 12, 13, 14 are arranged on the individual poles so as to be offset from each other in the direction of the rotor axis 15 represented in broken lines in FIG. 5. Thus, the eight pole rotor 10 shown in FIG. 5 in cross section along rotor axis 15, is made up of four pairs of individual structural elements, of which each pair are identical with respect to the ends of the rotor. With both end rotor parts lying opposite each other and 180° angled from each other on the rotor, as shown in FIG. 6 each pole carrier 11 lies at the outer end of each pole 20 and is embodied as one integral piece.

With poles 20 arranged between them, pole carriers 12, 13, 14 are staggered around the preceding pole carriers in the direction of rotor axis 15 on the inside of the pole, until finally both middle pole carriers 14 abut directly together in the axial midline when rotated around 180° in opposition to each other. With these poles, each pole carrier 14 coincides with the central plane of the rotor perpendicular to rotor axis 15.

Pole carrier 11, 12 need not have a circular annular form, but rather could be configured also as lobes or segments, as shown in FIG. 8. They also could be thinner and need not be axially butted together. Furthermore, pole carriers 11, 12 could also be formed without axial bores, in which case they could have a groove, rib, or similar profile, for engagement with a clamp or holding device on an axial support body.

In the embodiment shown in FIGS. 9 and 10, rotor 10 has only two end pole carriers 11, which are formed as an integral element with a pole 20. Each pole carrier has an axial opening 30 and a surrounding annular rim 41, which engages as a tongue and groove connection with a corresponding annular groove segment 42 at the free end of pole 20 of another identical structural part arranged oppositely at 180°.

In addition to the poles 20 mounted tightly on both pole carriers 11, this rotor has other poles 21, each of which have at both ends an annular groove segment 42, with which they are attached on the peripheral rim 41 of pole carriers 11 between poles 20. Also with this embodiment, poles 20, 21 extend over the entire length of rotor 10 in the direction of rotor axis 15.

Instead of a tongue and groove connection as in FIGS. 9 and 10, there can also be provided on a pair of carriers 11 a plurality of openings 43 for receiving pins, or noses, 44 at the ends of poles 20, 21 for an assembled connection, as shown in FIG. 11.

It is also possible to have a combination of the different connection systems, as shown in FIG. 12, in which the pole carriers 11 are not configured in one integral piece with a pole carrier 20, but are configured on their entire periphery either with a peripheral rim 41 or annularly arranges pins 44 for engagement respectively in a corresponding annular groove segment 42 or in corresponding openings 43 on the respective ends of insertable poles 21. With this embodiment, it is conceivable that at least one of the pole carriers 11 is configured with a shaft hub 16 extending in the direction of rotor axis 15, which is of such length that when the rotor is completely assembled, it abuts against a surface such as a hub 16 provided on the opposite pole carrier 11.

In the embodiment shown in FIG. 13, pole carriers 11 are connected integrally with each other by a hub 16 passing through and along rotor axis 15 to resemble a spool which consists of an elastically flexible plastic material or the like, so that poles 21 formed with wedge-shaped noses 45 on their ends can be inserted in corresponding annular grooves 46 on the opposite insides of pole carriers 11.

In the embodiment as in FIG. 14, pole carriers 11 are connected integrally with each other along rotor axis 15 by a hub 16 which passes therethrough, and consist of elastically flexible material, and herein each pole carrier 11 has a surrounding annular rim 41, which engages in a suitable annular groove segment 42 on each pole member 21, which is constructed similarly to the additional pole 21 in FIG. 10. As in all of the other embodiments, a ring 36 of ferromagnetic material is placed on the inside of pole members 21, which must be inserted in this case during the production of the spool-shaped form comprising the two pole carriers 11 and connecting hub 16.

In the embodiment shown in FIG. 15, the spool-shaped pole carrier has annular rims 41 not directed inwardly, but rather outwardly toward both ends of the rotor, and the poles or pole members 21 have a C-shape, so that their ends overlap the annular rims 41 on both pole carriers 11 with radially inward directed hook-shaped projections 47.

In all of the preceding embodiments instead of being aligned in axially parallel, directions, the poles may be aligned either obliquely or in spiral form relative to rotor axis 15.

I claim:

1. Multi-pole rotor for small and minature electric motors and generators for use in tachometers, stepping motors, synchronized clocks, and the like wherein a series of oppositely directed contiguous radially oriented magnetic poles are arranged segmentally about the periphery of the rotor extending parallel with each other and generally in the direction of the axial length of the rotor, said poles defining a continuous outer circumferential surface having alternating N-S-N-S . . . magnetic poles and a corresponding continuous inner circumferential surface having respective alternating S-N-S-N . . . magnetic poles, the respective end surfaces of all of said poles lying in only two axially spaced common planes and carrier means to mount said poles on a rotor shaft, said poles and carrier means being integrally fabricated from particulate highly coercive magnetic material with a binder, said carrier means comprising a pair of complementary disks with the integrally fabricated poles projecting generally axially from one side at the periphery of each disk, the poles of each disk being circumferentially spaced, whereby the poles of one disk will closely interfit with the poles of the other disk when the pair of disks are in axially facing abutting engagement.

2. Multi-pole rotor as defined in claim 1, wherein each of said disks is provided with an annular recess to receive a ferromagnetic ring adjacent the inner peripheries of the poles when the disks are in interfitting engagement, one of said disks being also provided with an axially projecting pin to be received within a complementary bore provided in the other disk.

* * * * *